Dec. 10, 1935. W. J. ALBERSHEIM ET AL 2,023,568
FLOW METER
Filed May 10, 1932
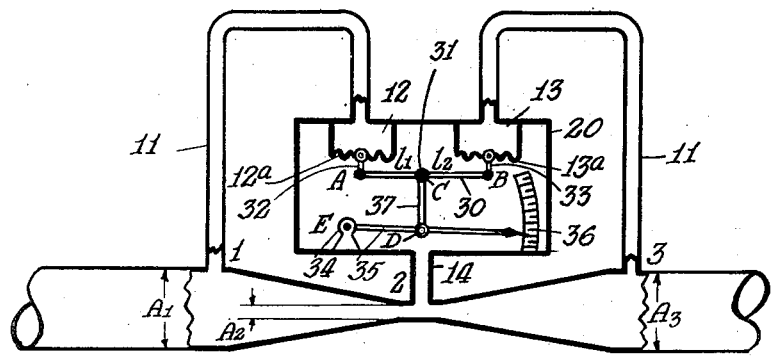
INVENTORS
W.J. ALBERSHEIM
H.S. KONHEIM
BY
ATTORNEY Patented Dec. 10, 1935

2,023,568

UNITED STATES PATENT OFFICE 2,023,568

FLOW METER

Walter J. Albersheim, and Harvey S. Konheim,
New York, N. Y.

Application May 10, 1932, Serial No. 610,464

3 Claims. (Cl. 73—167)

This invention relates to a flow meter for liquids in which the viscosity of the liquid flowing is compensated for, so that correct readings of the velocity of flow may be taken directly, regardless of the partitular viscosity of the liquid flowing.

The well known flow meter of the Venturi type comprises a conduit which has a change of diameter between two measuring points. The difference of the static pressures measured at these two points is used to indicate the quantity of flow per second. Thus, it has been mathematically determined that the rate of flow per second may be expressed as follows:

Eq. (1)

$$Q = KA_2 \sqrt{\frac{2\Delta p}{G\left(1-\frac{A_2^2}{A_1^2}\right)}}$$

where $Q$ is the rate of flow per second; $A_1$ is the area of the conduit at the measuring point $l$; $A_2$ the area of the conduit at the measuring point 2; $G$ the specific gravity of the liquid flowing; and $\Delta p$ is equal to the difference in pressures $(p_1-p_2)$ at the measuring points $l$ and 2, and $K$ is a constant.

Now, if we assume that the specific gravity $G$ is known and constant and that the liquid is very nearly a perfect liquid, that is, the pressure change between points $l$ and 2 is purely due to acceleration work, with negligible friction losses due to viscosity, when $Q$ is directly proportional to the square root of $\Delta p$, and a differential monometer can be calibrated directly in rate of flow units such as for example gallons per second.

If, however, the liquid does not approach the ideal condition, namely, that of a perfect liquid, but has a measurable internal friction or viscosity, the pressure drop between the measuring points $l$ and 2 will consist not only of a dynamic component which may be expressed mathematically as follows:

Eq. (2)

$$\Delta p_{dynamic} = \frac{GQ^2}{K2A_2^2}\left(1-\frac{A_2^2}{A_1^2}\right)$$

but also of a viscous component which is proportional to the rate of flow $Q$, the viscosity $y$ and the constant $C_1$. The constant $C_1$ is a function of the length, width and shape of the conduit between the points $l$ and 2. The pressure drop due to friction loss or viscosity may be expressed as:

Eq. (3)

$$\Delta p_{viscous} = yQC_1$$

The total pressure drop therefore is equal to the sum of Equation (2) and (3) which is as follows:

Eq. (4)

$$\Delta p_{total} = \frac{GQ^2}{K2A_2^2}\left(1-\frac{A_2^2}{A_1^2}\right)+yQC_1$$

From Equation (4) it will be seen at once that when the usual type of Venturi meter is used as a means to indicate the rate of flow of liquid in a conduit, the viscosity of that liquid enters into the determination as an important factor, and obviously in measuring the rate of flow of liquids of varying unknown viscosities the readings obtained will be substantially in error due to this factor.

It is therefore an object of this invention to devise a direct reading flow meter which automatically corrects for the error introduced by the viscosity of the liquid being measured, with the result that an apparatus is provided which will indicate correctly the rate of flow of any liquid of indeterminate or unknown viscosity.

It is a further object of this invention to provide a direct reading flow meter which is constructed and arranged in such a way that the errors normally introduced by changes in viscosity are automatically balanced out and a correct reading obtained.

The manner in which the present invention is carried out will be readily understood by those skilled in the art from the following description taken in connection with the accompanying drawing, in which:

The figure is a diagrammatic representation of a device embodying the principles of this invention.

Referring in detail to the figure of the drawing, the device is seen to comprise a conduit $10$ having an area $A_1$ at the measuring point $l$, an area $A_2$ at the measuring point $2$, and an area $A_3$ at the measuring point $3$. It will be understood, of course, that this conduit is merely shaped in the form of the usual type of Venturi meter having a substantially narrow passage which indicates the change in pressure by virtue of the increased velocity caused by the passage of the liquid therethrough. The velocities $V_1$, $V_2$ and $V_3$ of the liquid flowing at the points 1, 2 and 3 respectively may be expressed as follows:

$$V_1 = \frac{Q}{A_1}$$
$$V_2 = \frac{Q}{A_2}$$
$$V_3 = \frac{Q}{A_3}$$

Now, the pressure drop between the points 1 and 2, as explained above, equals:

*Eq. (5)*

$$p_1 - p_2 = \Delta_1 = \frac{Q^2 G}{K 2 A_2^2}\left(1 - \frac{A_2^2}{A_1^2}\right) + Q y C_1$$

Similarly, for the pressure difference between the pressures $p_2$ and $p_3$, taken at the points 2 and 3 respectively we have:

*Eq. (6)*

$$p_2 - p_3 = \Delta_2 = Q^2 \frac{G}{K 2 A_3^2}\left(1 - \frac{A_3^2}{A_2^2}\right) + Q y C_2$$

where $C_2$ is a constant depending upon the length, width and shape of the conduit between the points 2 and 3.

From Equations (5) and (6) we derive:

*Eq. (7)*

$$p_1 - p_2 - \frac{C_1 p_2}{C_2} + \frac{C_1 p_3}{C_2} = \frac{Q^2 G}{K 2 A_2^2}\left(1 - \frac{A_2^2}{A_1^2} + \frac{C_1}{C_2} - \frac{C_1}{C_2} \cdot \frac{A_2^2}{A_3^2}\right)$$

It will be seen that Equation (7) no longer contains term $y$ or viscosity any more. It therefore follows that if we combine, in a suitable manner, the pressure differences of the measuring points 1, 2 and 3. we may readily obtain a value for the rate of flow of the liquid, which is independent of the viscosity of that liquid. It is preferable, although not necessary, to introduce one or both of two simplifications in the physical relations expressed in Equation (7)

The first is to make $A_3$ equal to $A_1$. This reduces Equation (7) to:

*Eq. (8)*

$$p_1 - p_2 - \frac{C_1 p_2}{C_2} + \frac{C_1 p_3}{C_2} = \frac{Q^2 G}{K 2 A_2^2}\left(1 + \frac{C_1}{C_2}\right)\left(1 - \frac{A_2^2}{A_1^2}\right)$$

Furthermore, if we arrange the lengths and shapes of the conduit sections between the points 1 and 2 and 2 and 3 respectively in such a manner that the friction constants $C_1$ and $C_2$ are made equal then Equation (8) is further simplified to the following form:

*Eq. (9)*

$$p_1 + p_3 - 2 p_2 = \frac{Q^2 G}{K A_2^2}\left(1 - \frac{A_2^2}{A_1^2}\right)$$

In any of the forms of Equations (7), (8) and (9), however, it is seen that the pressure readings are dependent only upon certain physical constants of the conduit and are independent of the term $y$ representing the viscosity of the liquid.

Having shown mathematically the underlying principles involving the present invention, it now remains merely necessary to arrange the physical apparatus in such a way that the pressure relations concerned in the mathematical analysis may be actually determined. In other words, it merely remains necessary for us now to show how to build an apparatus of the type shown in Fig. 1 which will indicate the values of $$(p_1 - p_2) + \frac{C_1}{C_2}(p_3 - p_2)$$

Referring now specifically to the diagram of Fig. 1, the pipe 11 connected to the conduit 10 at the measuring point 1 leads to an instrument chamber 20, the front wall of which contains a transparent portion such as for example a glass wall. A pressure responsive mechanism 12 having a movable member 12a is connected to the pipe 11 whereby the pressure at the point 1 in the conduit 10 may actuate member 12a. Similarly, a second pressure responsive mechanism 13 having a movable member 13a is connected to the measuring point 3 of the conduit 10 by means of another pipe 11. The chamber 20 communicates with the measuring point 2 by a pipe 14, whereby the pressure at the point 2 in the conduit 10 is communicated to the interior of the chamber 20 and is made to act upon the underside of the movable members 12a and 13a of the pressure responsive mechanisms 12 and 13 respectively. It will thus be seen that the movement of the member 12a is governed by the difference in pressure between the points 1 and 2; and in the same way the movement of the member 13a is governed by the difference in pressure between the points 2 and 3.

In order to indicate the differential movement caused by the indicating members of the pressure responsive mechanisms 12 and 13 the following apparatus is provided:

A rod 30 pivoted at the point 31 is connected to the members 12a and 13a by links 32 and 33 respectively. A fixed pivot 34 is joined to the casing 20 and a movable arm 35 pivotally joined to 34 is provided with a pointer which plays over a scale 36. The link 37 connects the arm 35 at C with the rod 30 whereby the differential movement of the members 12a and 13 is translated to the arm 35 thus causing its indicator to play over the scale 36 which may be calibrated directly in any suitable units of flow per second.

It will now be shown mathematically that the movement of the arm 35 indicates the value of $$(p_1 - p_2) + \frac{C_1}{C_2}(p_3 - p_2)$$

The response of the pressure responsive device 12 may for example be Y cm. per unit of pressure; that of 13, Z cm. per unit of pressure. The center points of the two members 12a and 13a, or in other words, the center points of the two diaphragms of the pressure responsive devices are connected to the end pivots A and B of the rod 30. The lengths of the arms are $AC = l_1$, and $CB = l_2$. The center pivot C is connected to a pivot D of the indicator arm which turns about the rigid pivot point 34. The lengths of the pivot arms are so adjusted that:

*Eq. (10)*

$$\frac{l_1}{l_2} = \frac{a_1 C_1}{a_2 C_2} \text{ or } a_2 l_1 = a_1 l_2 \cdot \frac{C_1}{C_2}$$

$a_1$ and $a_2$ are the compliance constants of the differential pressure gauges 12 and 13, respectively and denote their diaphragm deflections per unit pressure difference.

The pressure $(p_1 - p_2)$ acting on the diaphragm 12a will push A downward by an amount equal to $a_1(p_1 - p_2)$, and thereby the point 31 will be moved by an amount equal to:

*Eq. (11)*

$$\text{distance} = \frac{l_2}{l_1 + l_2} \cdot a_1(p_1 - p_2)$$

Similarly, the pressure $(p_3 - p_2)$ acting on the diaphragm 13a will push B downward by an amount equal to $a_2(p_3-p_2)$ and thereby the point 31 by an amount equal to:

$$\text{Eq. (12)}$$

$$\text{distance} = \frac{l_1}{l_1+l_2} a_2(p_3-p_2)$$

Consequently, the movement of the point 31 caused by the combined action of the diaphragms 12a and 13a equals:

$$\text{Eq. (13)}$$

$$\frac{1}{l_1+l_2}[a_1 l_2(p_1-p_2)+a_2 l_1(p_3-p_2)]$$

Substituting Equation (10) in Equation (13) we have:

$$\text{Eq. (14)}$$

$$\frac{a_1 l_2}{l_1+l_2}[p_1-p_2+\frac{C_1}{C_2}(p_3-p_2)]$$

It is therefore obvious that the diaphragm devices can be made to indicate a constant relationship of the pressures at the measuring points and also that these diaphragm devices can be replaced by any other means giving the approximate linear response to pressure differences. Also, it is obvious that the lever combinations shown may be substituted by any equivalent means which will give mechanical movements in accordance with the desired pressure relationships.

It will therefore be seen that we have devised a measuring instrument which may indicate directly the rate of flow of the liquid independent of its viscosity.

It will be understood, of course, that many changes in the herein-disclosed specific embodiments will readily suggest themselves to those skilled in the art. We therefore do not intend to be limited to details of constructions and operation, except as defined in the appended claims.

Having thus described our invention, we claim:

1. A flow meter comprising a conduit having a Venturi section, said section having equal areas of cross-section at two spaced points and a third area of smaller cross-section at an intermediate point, a first pressure responsive device provided with a yieldable member, a second pressure responsive device having a yieldable member, one connection only from the conduit at one of said spaced points to the first device, one separate connection only from the conduit at the other of said spaced points to said second device, whereby the pressures at the said points are exerted on one side of the movable members of said devices each to each, one connection only for exerting the pressure at said intermediate point upon the other side of each of said members, a pointer, a scale, and a link connection joined to said members for moving said pointer over said scale in accordance with the differential movement of said movable members.

2. A flow meter comprising a conduit having a Venturi section, said section having equal areas of cross-section at two spaced points and a third area of smaller cross-section at an intermediate point, a first pressure responsive device provided with a yieldable member, a second pressure responsive device having a yieldable member, one connection only from the conduit at one of said spaced points to the first device, one separate connection only from the conduit at the other of said spaced points to said second device, whereby the pressures at the said points are exerted on one side of the movable members of said devices each to each, one connection only for exerting the pressure at said intermediate point upon the other side of each of said members, and means for indicating the resultant of said three pressures.

3. A flow meter comprising a conduit having a Venturi section, said section having equal areas of cross-section at two spaced points and a third area of smaller cross-section at an intermediate point, a first pressure responsive device provided with a yieldable member, a second pressure responsive device having a yieldable member, one connection only from the conduit at one of said spaced points to the first device, one separate connection only from the conduit at the other of said spaced points to said second device, whereby the pressures at the said points are exerted on one side of the movable members of said devices each to each, one connection only for exerting the pressure at said intermediate point upon the other side of each of said members, a pointer, a scale, and means for moving said pointer over said scale in accordance with the resultant movements of said yieldable members.

WALTER J. ALBERSHEIM.
HARVEY S. KONHEIM.